(No Model.)

C. W. HOWARD.
TELEPHONE CALL ANNUNCIATOR.

No. 300,976. Patented June 24, 1884.

Witnesses:
E. G. James
R. Platz

Inventor:
Charles W. Howard
By Stout & Underwood
Attorneys.

UNITED STATES PATENT OFFICE.

CHARLES W. HOWARD, OF NEENAH, WISCONSIN.

TELEPHONE-CALL ANNUNCIATOR.

SPECIFICATION forming part of Letters Patent No. 300,976, dated June 24, 1884.

Application filed April 25, 1884. (No model.)

*To all whom it may concern:*

Be it known that I, CHARLES W. HOWARD, of Neenah, in the county of Winnebago, and in the State of Wisconsin, have invented certain new and useful Improvements in Telephone-Call Annunciators; and I do hereby declare that the following is a full, clear, and exact description thereof.

My invention relates to telephone-call indicators, and will be fully described hereinafter.

Figure 1:
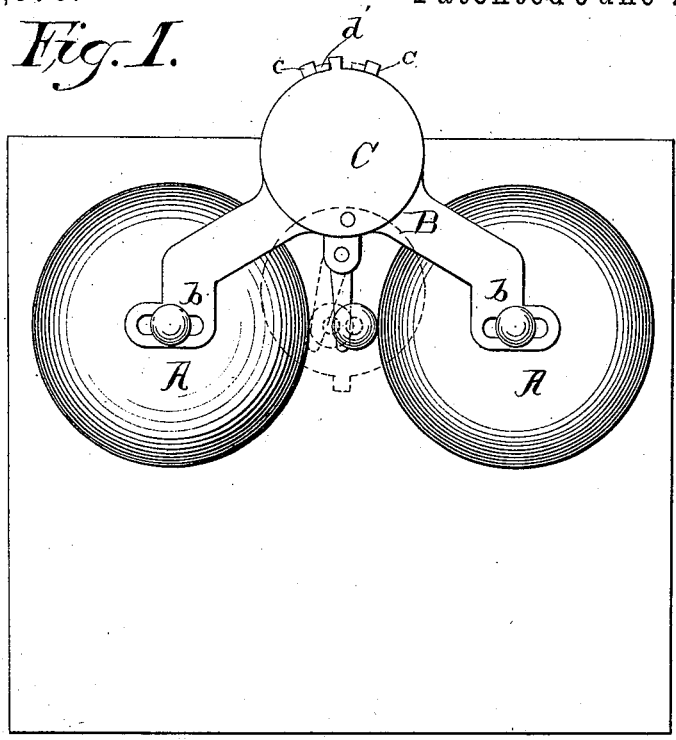
Figure 2:
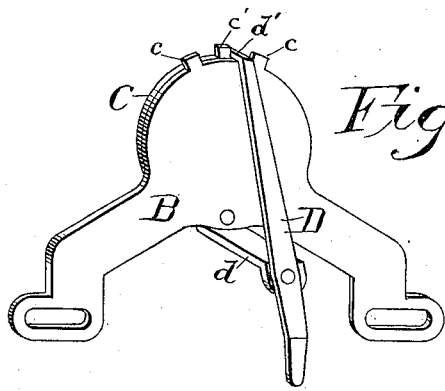

In the drawings, Figure 1 is a front view of a call-box with my invention applied thereto, and Fig. 2 is a rear perspective of my device.

A A are the ordinary call-bells, and B is the frame of my device, which latter has arms $b\ b$, that are slotted to fit upon the spindles of the bells, a thumb-nut serving to secure each arm in place. The apex of the frame B has two small lugs, $c\ c$, projecting up from it, and to the face of the frame is pivoted a disk, C, from the top of which a lug, $c'$, projects. A short bar, $d$, is secured to the under side of the frame B, just beneath the pivot of the disk C, and this bar projects back a short distance and terminates in a bend to which a lever, D, is pivoted. The upper end of this lever is bent at a suitable angle to form a horizontal lug, $d$, that extends between the lugs $c\ c$ and out into the line of travel of the lug on the disk, while the lower end of lever D extends down below its pivotal point across the line of travel of the bell-clapper when my device is in position on the bells.

The operation of my device is extremely simple. After a call the disk is turned up in the position shown in the full lines in the figures, and when the next call is made the ringing of the bell vibrates the lever D and causes its lug $d'$ to strike the lug $c'$ of disk C and throw the latter over its dead-center, when it falls into the position shown in dotted lines, Fig. 1, showing that a call has been made.

While I have shown my device as applied to upright telephone-boxes, it is obvious that it may be easily modified so as to adapt it for use on flat boxes.

Having thus described my invention, what I claim as new, and desire to secure by Letters Patent, is—

1. An annunciator for telephone-call bells, consisting of a frame having arms by which it is adjusted on the bells, in combination with a disk pivoted to it, and a lever, one end of which engages with the disk and the other with the clapper of the bell, as set forth.

2. In annunciators for telephone-bells, the frame B, having slotted arms and lugs, in combination with a pivoted disk, C, and lever D, as set forth.

In testimony that I claim the foregoing I have hereunto set my hand, at Milwaukee, in the county of Milwaukee and State of Wisconsin, in the presence of two witnesses.

CHARLES W. HOWARD.

Witnesses:
S. S. STOUT,
H. G. UNDERWOOD.